May 5, 1931.  C. F. H. BOHNHARDT ET AL  1,803,889
NONCORRODING VALVE
Filed March 14, 1927
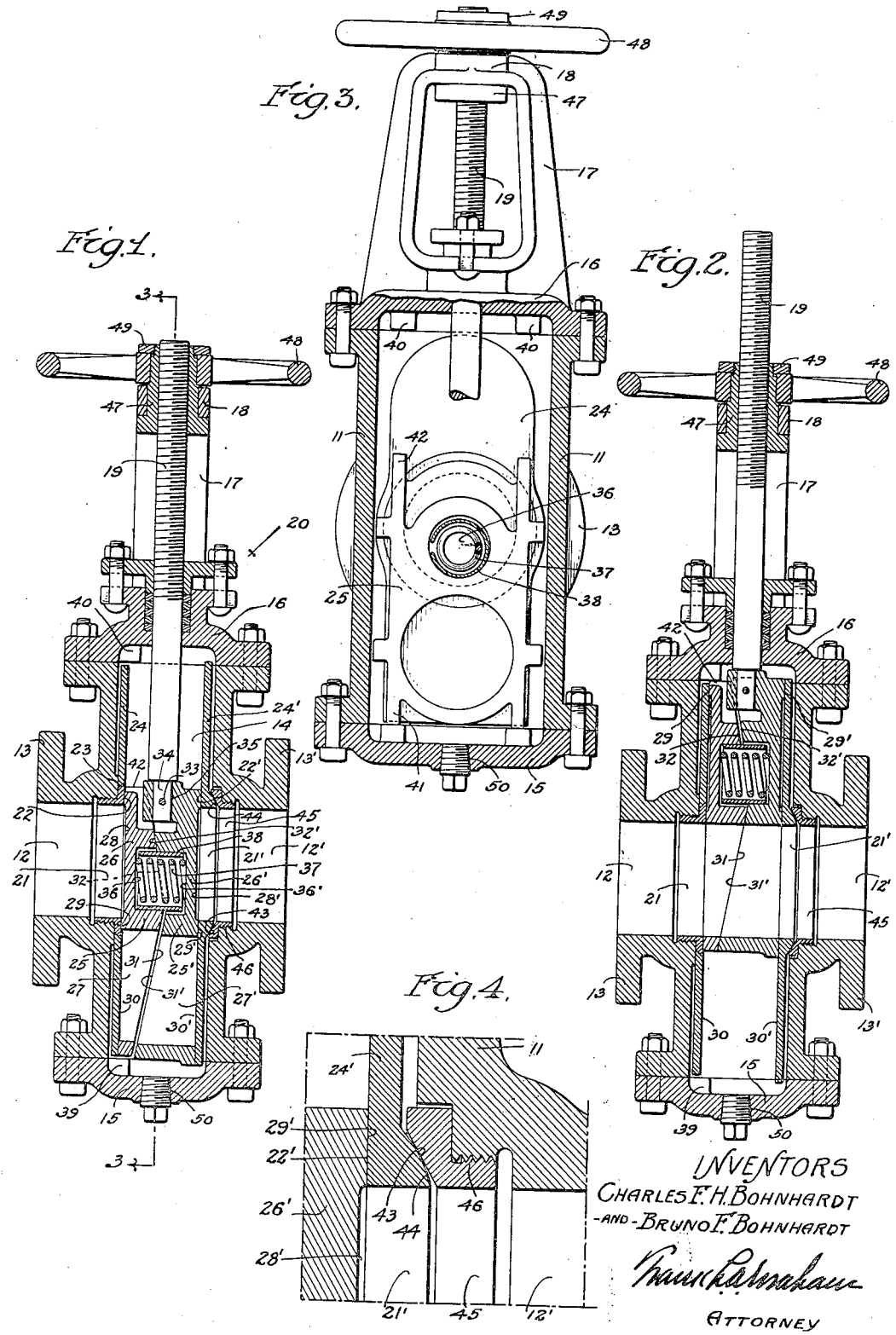
INVENTORS
CHARLES F. H. BOHNHARDT
AND BRUNO F. BOHNHARDT
ATTORNEY Patented May 5, 1931

1,803,889

UNITED STATES PATENT OFFICE

CHARLES F. H. BOHNHARDT AND BRUNO F. BOHNHARDT, OF LYNWOOD, CALIFORNIA

NONCORRODING VALVE

Application filed March 14, 1927. Serial No. 175,085.

It is an object of our present invention to provide a valve, preferably comprising an inwardly facing flat valve seat or valve seats, with means favorable not only to a full opening and to a tight closure of said valve, to permit or to prevent advance of a fluid therethrough, but with means whereby said valve seat or valve seats are protected from abrasion and/or corrosion, regardless of whether an interior valve organization occupies a flow-preventing or a flow-permitting position; and, in preferred embodiments of our invention, a main casting or body being preferably provided with separately removable top and/or bottom closure elements, one or both of said closure elements may advantageously be provided with a stop or stops, engageable by a shiftable unit or units, to produce a wedging engagement whereby said shiftable unit or units are pressed toward a valve seat or seats, to protect the same.

It is a matter of common observation that although valves may undergo little deterioration so long as they remain closed, the maintenance of ordinary valve elements in an open position commonly results in erosion and/or corrosion of seats or closure elements,—so that, when an effort is made to prevent flow therethrough, in case of fire or other emergency, said valves will not close satisfactorily; and it is a general object of our invention to provide valves in which valve seats and/or closure elements may be protected at all times,—regardless of whether the air valves be normally kept open or normally kept closed; and, in preferred embodiments of our invention, a wedging action between mutually shiftable complemental units may be effective so to protect the opposing faces of oppositely disposed valve seats and closure elements therefor that no appreciable leakage of fluid need result from the withdrawal of a plug or from the removal of an end plate or plates from our valves while a fluid be advancing therethrough.

Other objects of our invention, including the provision of removable interior guides, obviating the necessity for expensive machine work upon the interior of the mentioned main body or casting (one of a pair of oppositely disposed guide elements being preferably retained by a seat element and the opposite guide element being preferably formed integral with a seat element and provided with a ball-ground surface) and including also the use of a valve organization which comprises counterpart shiftable units (each comprising a closure section and an apertured section and each provided also with wedge surfaces and with means limiting the play therebetween) may be best appreciated from the following description of an illustrative embodiment of our invention, taken in connection with the appended claims and the accompanying drawings, in which

Fig. 1 is a substantially median sectional view, taken in the plane of the longitudinal axis of a passage through a valve embodying our invention,—parts of an interior organization being shown as occupying a "closed" position.

Fig. 2 is a view similar to Fig. 1, but showing the interior valve organization as shifted to an "open" position.

Fig. 3 is a transverse sectional view, taken substantially as indicated by the broken line 3—3 of Fig. 1.

Fig. 4 is a detail view, corresponding to a right central portion of Fig. 1, and showing, on an enlarged scale, a preferred type of joint between a guide plate providing a valve seat and a socket element in which the same may be positioned in a self-centering manner.

Referring to the details of that specific embodiment of our invention chosen for purposes of illustration, 11 may be a main casting constituting a valve body,—this body being shown as integral with tubular portions 12, 12', terminating in flanges 13, 13' (whereby said body may be interposed in a pipe line, in a known manner); and a chamber 14, provided by said body, is shown as closed by a bottom plate 15 and a top plate 16,—the latter being shown as integral with an upstanding member 17, which comprises a yoke 18, and both said top plate and said yoke being apertured to receive a valve operating rod 19, shown as surrounded by a gland 20.

One or both of the tubular portions 12, 12' may be provided with an integral or removable valve seat,—an exteriorly threaded seat element 21 being shown as provided not only with a flat face 22, engageable by any suitable closure element, but with a conical or convex rear surface 23, adapted to engage a guide element 24 and to retain the same in a plane substantially parallel with the longitudinal axis of the slidable valve operating rod 19, or its equivalent.

Opposite the guide plate 24, or its equivalent, we may dispose a shiftable valve unit 25, shown as comprising a closure section 26 and an apertured section 27,—the mentioned closure section being shown as provided with a slight depression at 28, surrounded by a flat area 29 adapted to engage the flat surface 22 of the seat element 21, and an aperture through the section 27 being surrounded by an annular area 30 constituting a continuation of said flat surface; and, in order that an axial movement of the slidable rod 19, or its equivalent, after shifting the unit 25 from one illustrated position to another, in a plane parallel with the longitudinal axis of the rod 19, shall be effective to advance said unit, by a movement substantially at right angles to the shifting referred to, (to force either the annular flat area 29 or the annular flat area 30 tightly against the annular flat surface 22 of the seat 21), I may provide the unit 25 with inclined surfaces such as are shown at 31 and 32, and I may dispose in operative relationship with the unit 25 a complemental unit 25'. To this last-mentioned slidable unit the rod 19 may be secured by means such as a pin 33, extending through a reduced terminal portion 34 of said rod and through an apertured portion 35 of said unit,—the latter being shown as provided with inclined or wedge surfaces 31' and 32', respectively corresponding in inclination with the mentioned surfaces 31 and 32, but so cut as to permit a limited relative longitudinal movement between the units 25 and 25'.

Our invention being shown as embodied in a so-called gate valve, in order to obtain not only satisfactory guidance but the advantages of a so-called "double" gate, we may provide a second guide element 24' with a flat inner surface including a seat area 22' surrounding an opening 21'; and we may provide this complemental unit 25', or its equivalent, with not only a depression 28' surrounded by an annular flat area 29' but with an aperture 27' surrounded by an annular flat area 30', continuous with the flat area 29' and parallel with the surfaces 29 and 30 upon the shiftable unit 25, or its equivalent.

In order resiliently to press the units 25 and 25' lightly in opposite directions toward the respective seats 22 and 22', chambering these units by the cutting of circular or other depressions 36, 36' therein, we may dispose within the central space so provided a resilient element such as a compression spring 37, this being shown as surrounded by a protecting and centering clip 38. The latter is preferably of such size, shape and material as not to interfere with a limited relative movement between the units 25 and 25', as produced by an advance or retraction of the rod 19; and, in order that, near the completion of such an advance or retraction, an engagement between one of the mentioned pairs of inclined surfaces (31, 31' or 32, 32') shall be effective to force the respective units outward, in such manner that the mentioned flat annular areas thereon shall protect the seats 22 and/or 22', I may provide (as, upon one or both of the end plates 15, 16) stop elements such as are suggested at 39 and 40.

Except that the guide plate 24 is preferably so formed as to include the flat seat 22', both of the mentioned plates may advantageously have substantially the general outline shown in Fig. 2,—although only the unit 25, indirectly manipulated in the described manner, need be provided with stop-engaging fingers 41, 42; and in order to obviate necessity for too much accurate machine work within the body 11, or its equivalent, the plate 24', when formed separate, may be provided with a ball-ground or other convex inner surface, as at 43, adapted to interfit with a surface 44 within a similarly ground or conically concave socket element 45 (shown as retained in the body 11 by a threaded engagement at 46) the result being that the plate 24' is adapted automatically to center itself in a plane accurately parallel with the plate 24.

In use, assuming that the rod 19 is not swiveled to either of the interfitting units 25, 25', a nut element 47 being positioned above or below the yoke 18, or its equivalent, and preferably provided with manipulating means such as a hand wheel 48 (shown as retained by a subsidiary nut 49) it will be understood that whenever the rod 19, or its equivalent, is forced inward, so long as fingers 41 engage stops 39, a wedging action between the inclined faces 32 and 32' is effective tightly to press the closure sections 26 and 26' against the seat faces 22, 22', thereby protecting the same while the valve remains closed; and, whenever an opposite or retractive movement of the rod 19, or its equivalent, brings the fingers 42 into engagement with stops 40, or their equivalent, an analogous engagement between the wedge faces 31 and 31' is effective, at the time the openings 27 and 27' are brought into concentric relationship with one another and with the passages 12, 12', to hold the alternative protective areas 30, 30' tightly against the seat surfaces 22, 22',—thereby obviating wear or corrosion even while our described valve stands wide open. At such times, it will be noted that the surfaces 29, 29' are also protected by engagement with the plates 24, 24',—the result being that even though the fluid passing through our valved organization is of such character as appreciably to cut or corrode any exposed surfaces, our valves will be found capable of efficient action even after they have been left wide open for long periods of use; and it will be noted, as an important merit of our valves, that the final tightening of the described shiftable units relatively to the seats 22, 22', is effected by a pressure substantially perpendicular to the surfaces of said seats. In fact, although we suggest the provision of a plugged opening at 50, (suitable to permit inspection or the withdrawal of a sample upon a momentary shifting of the described interior valve organization to an intermediate position) the relationships and the fit between the described parts may be such as would permit actual removal of one or both of the bottom and top plates (15 and/or 16) even while our valves stand wide open.

Although we have herein described a single complete embodiment of our invention, it should be understood not only that various features of this invention might be independently employed but also that numerous alternative embodiments thereof might be devised by those skilled in the arts to which this case relates, without involving the slightest departure from the spirit and scope of our invention, as the same is indicated above and in the following claims.

We claim as our invention:

1. In a valve of the general character described: a main body providing a passage for the advance of a fluid; a seat element secured therein; an interior organization shiftable within said body between a flow-obstructing position and a flow-permitting position relatively to said seat; and means for shifting said interior organization relatively to said seat,—said interior organization comprising a plurality of shiftable units each provided with a closure section and with an apertured section and each provided with a wedge face, resilient means being interposed between said units.

2. In a valve of the general character described, a main body providing passages for the advance of fluid; oppositely disposed seat elements therein; said seats comprising associated guide elements, an interior organization shiftable between said guide elements within said body between a flow obstructing position and a flow permitting position relatively to said seat elements; means for shifting said interior organization between said guide elements relatively to said seat elements, and one of said seat elements being provided with a ball ground surface to allow accommodating movement of its associated guide element, said ball ground surface seating on a member having a socket ground surface, said member being screw-threadedly fixed in one of said passages.

3. In a valve of the general character described: a main body providing a passage for the advance of a fluid; a seat element secured therein; an interior organization shiftable within said body between a flow-obstructing position and a flow-permitting position relatively to said seat; and means for shifting said interior organization relatively to said seat, said interior organization comprising a plurality of shiftable units, each provided with a closure section and with an apertured section and with corresponding wedge faces, resilient means being interposed between said units, and stop means arranged to engage one of said units during shifting to set up a wedging action therebetween.

4. In a valve of the general character described: a main body providing a passage for the advance of a fluid; a seat element secured therein; an interior organization shiftable within said body between a flow-obstructing position and a flow permitting position relatively to said seat; and means for shifting said interior organization relatively to said seat, said interior organization comprising a plurality of shiftable units, each provided with a closure section and with an apertured section, and each provided with a pair of corresponding wedge faces, said faces being arranged to set up a wedging action between said units when the same one of said units is stopped in either direction during shifting and means for stopping the said unit at a flow obstructing position or a flow permitting position.

5. In a valve of the general character described: a main body providing a passage for the advance of a fluid; a seat therein; an interior organization shiftable within said body between a flow-obstructing position and a flow-permitting position, said interior organization comprising a pair of shiftable units with cooperating wedge faces, each unit being provided with a closure section and an apertured section; means connected to one of said units for shifting said interior organization relative to said seat; and means for stopping the other of said units during shifting in either direction to set up a wedging action between said units at a flow-obstructing or a flow-permitting position.

In testimony whereof, we have hereunto set our hands at Los Angeles, California, this 4th day of March, 1927.

CHARLES F. H. BOHNHARDT.
BRUNO F. BOHNHARDT.